(12) United States Patent
Chen et al.

(10) Patent No.: US 9,575,237 B2
(45) Date of Patent: Feb. 21, 2017

(54) LIGHT GUIDE ELEMENT AND LIGHT SOURCE DEVICE USING THE LIGHT GUIDE ELEMENT

(71) Applicant: Radiant Opto-Electronics Corporation, Kaohsiung (TW)

(72) Inventors: Wei-Hsuan Chen, Kaohsiung (TW); Kai-Chun Yang, Kaohsiung (TW); Yuan-Chen Chung, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 101 days.

(21) Appl. No.: 14/590,961

(22) Filed: Jan. 6, 2015

(65) Prior Publication Data

US 2015/0117057 A1    Apr. 30, 2015

Related U.S. Application Data

(63) Continuation-in-part of application No. 13/868,122, filed on Apr. 23, 2013, now abandoned.

(30) Foreign Application Priority Data

Dec. 24, 2012  (TW) .............................. 101149535 A

(51) Int. Cl.
   *F21V 8/00* (2006.01)
   *G02B 6/42* (2006.01)

(52) U.S. Cl.
   CPC ............. *G02B 6/0061* (2013.01); *G02B 6/002* (2013.01); *G02B 6/0016* (2013.01); *G02B 6/0063* (2013.01)

(58) Field of Classification Search
   CPC ..... G02B 6/002; G02B 6/0016; G02B 6/0061; G02B 6/0063
   See application file for complete search history.

(56) References Cited

U.S. PATENT DOCUMENTS

| 7,273,311 B2 * | 9/2007 | Yu ........................ G02B 6/0038 362/612 |
| 7,559,681 B2 * | 7/2009 | Suehiro ................ G02B 6/0061 362/330 |

(Continued)

FOREIGN PATENT DOCUMENTS

| CN | 1482497 A | 3/2004 |
| CN | 101128696 A | 2/2008 |

(Continued)

*Primary Examiner* — Alan Cariaso
(74) *Attorney, Agent, or Firm* — CKC & Partners Co., Ltd.

(57) ABSTRACT

A light guide element and a light source device using the same are provided. The light guide element has a main body. The main body has a hollow portion with a cone shape and a microstructure pattern formed on the main body. The cone-shaped hollow portion has a bottom portion and a top portion. The bottom portion is located on the bottom surface of the main body, and has a first hollow cross section area. The top portion is opposite to the bottom surface, and has a second cross section area smaller than the first cross section area. The microstructure pattern includes high-density areas and low-density areas to improve a light distribution caused by the cone-shaped hollow portion. The light source device includes the light guide element and a ht emitting diode (LED). The LED is used to emit light into the cone-shape hollow portion through the bottom portion.

15 Claims, 19 Drawing Sheets

(56) References Cited

U.S. PATENT DOCUMENTS

| | | | |
|---|---|---|---|
| 7,791,683 B2 * | 9/2010 | Larson | G02B 6/0018 349/62 |
| 8,814,391 B2 * | 8/2014 | Koh | G02B 6/0021 313/512 |
| 9,322,970 B2 * | 4/2016 | Hesse | G02B 6/0018 |
| 2002/0136027 A1 | 9/2002 | Hansler et al. | |
| 2004/0042194 A1 | 3/2004 | Hsieh | |
| 2006/0126358 A1 * | 6/2006 | Chen | G02B 6/0061 362/611 |
| 2007/0147023 A1 | 6/2007 | Matsushita | |
| 2009/0016057 A1 | 1/2009 | Rinko | |
| 2009/0141208 A1 | 6/2009 | Byoun et al. | |
| 2010/0002169 A1 | 1/2010 | Kuramitsu et al. | |
| 2012/0140519 A1 | 6/2012 | Sakai | |
| 2012/0307495 A1 | 12/2012 | Shih | |

FOREIGN PATENT DOCUMENTS

| | | |
|---|---|---|
| CN | 101617252 A | 12/2009 |
| CN | 101750667 A | 6/2010 |
| TW | 200712642 | 4/2007 |
| TW | 200716909 A | 5/2007 |
| TW | 200921149 A | 5/2009 |
| TW | 201215936 A | 4/2012 |
| TW | 201400891 A | 1/2014 |

\* cited by examiner

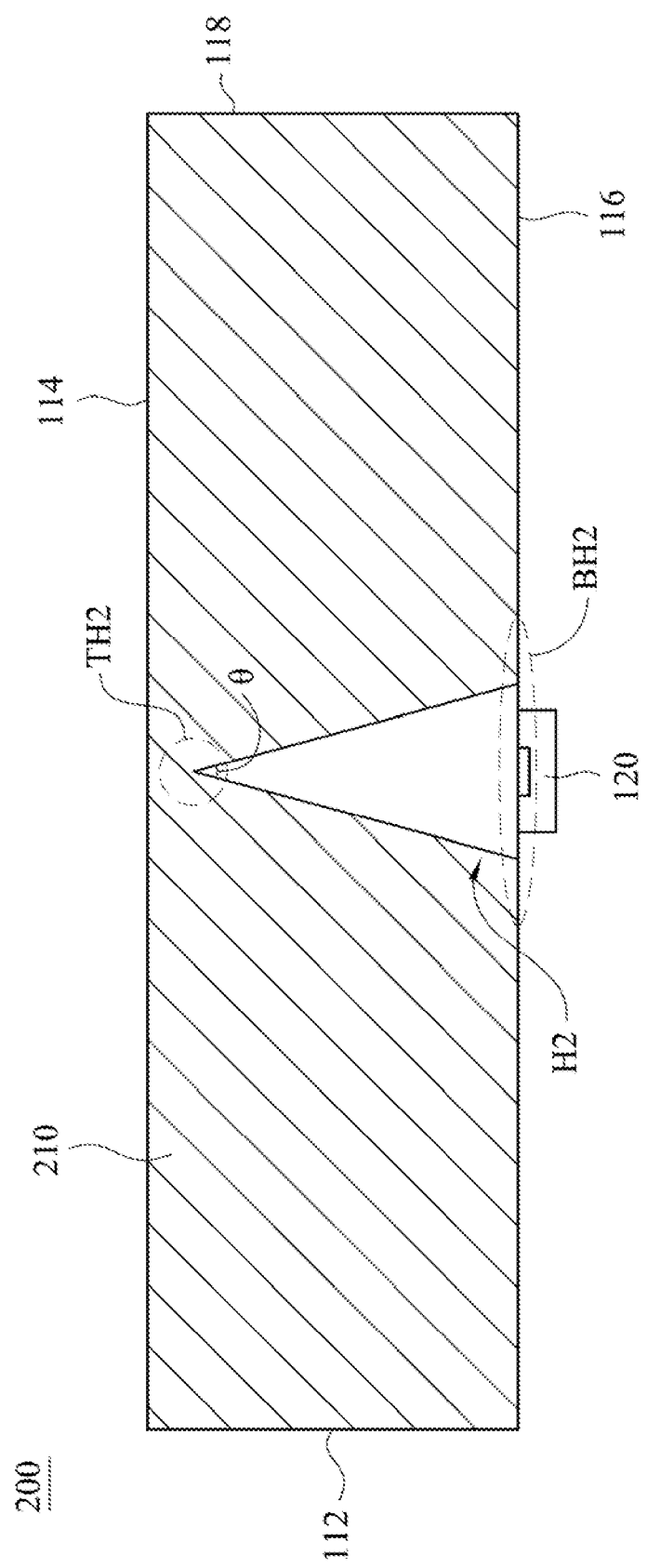

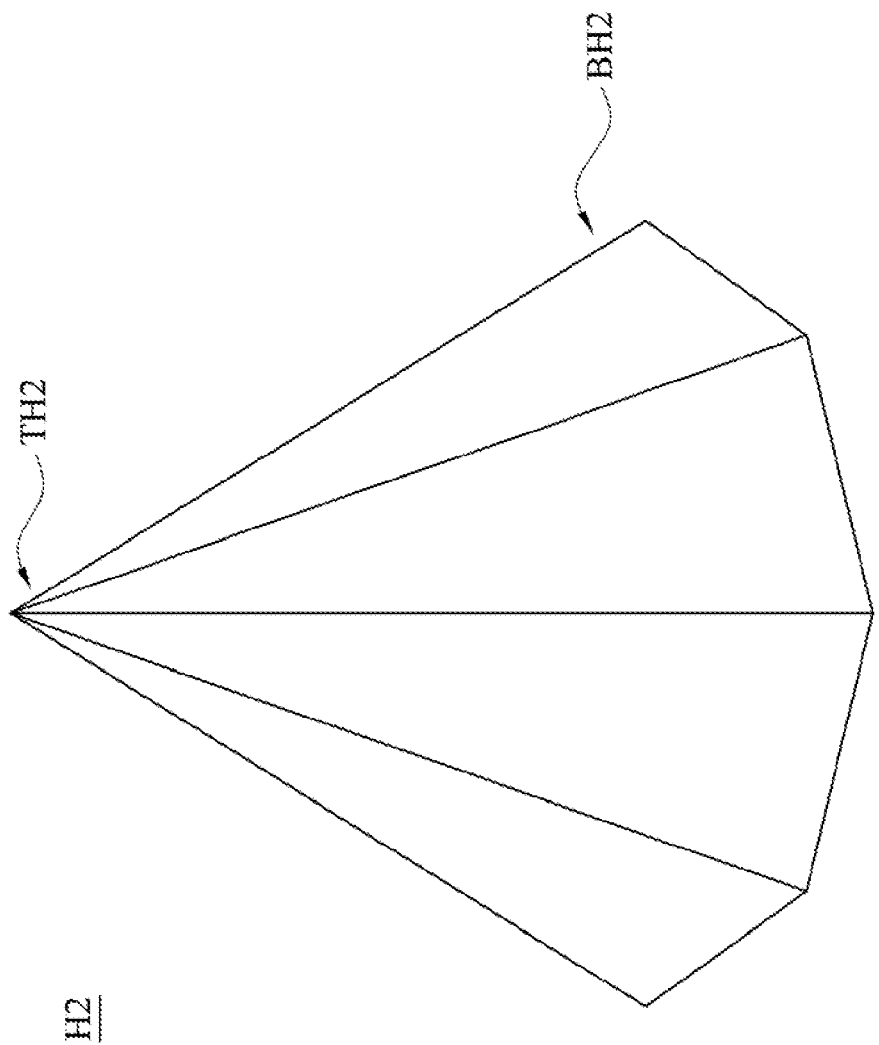

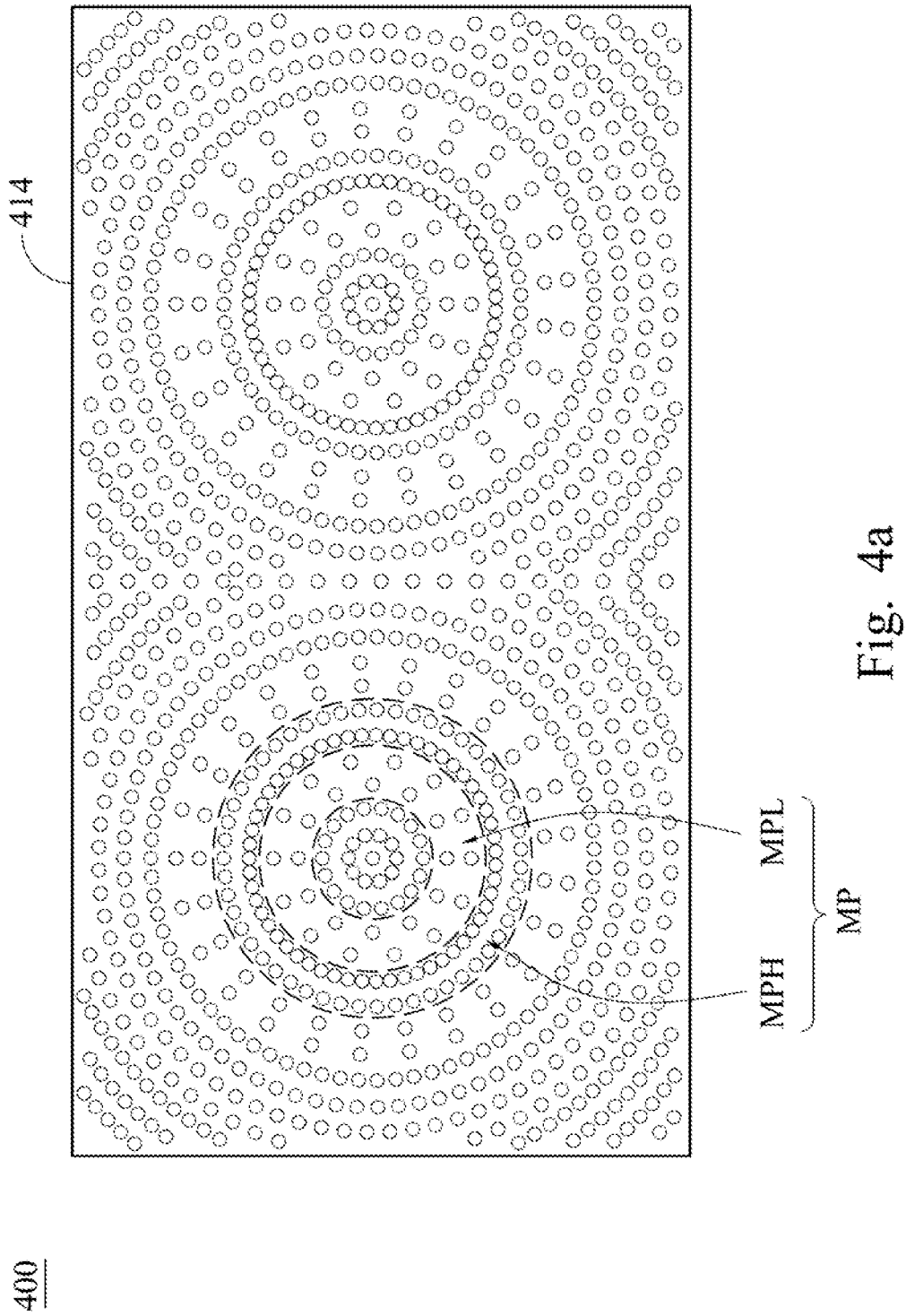

LIGHT GUIDE ELEMENT AND LIGHT SOURCE DEVICE USING THE LIGHT GUIDE ELEMENT

CROSS-REFERENCE TO RELATED APPLICATIONS

This application is a continuation-in-part of U.S. application Ser. No. 13/868,122, filed on Apr. 23, 2013, which claims priority to Taiwan Application Serial Number 101149535, filed Dec. 24, 2012, which is herein incorporated by reference.

FIELD OF THE INVENTION

A light guide element and a light source device using the light guide element are provided, and more particularly, to a light guide element which can uniformize light and a light source device using the light guide element.

BACKGROUND OF THE INVENTION

Light source devices play an important role in human life, and may be applied in various areas such as in a building, in a vehicle, or on a decoration article. Light source device is not only an illumination tool but has great impact human daily life.

General light source devices include an incandescent lamp, a fluorescent lamp, and a light emitting diode (LED) lamp, etc. In a conventional incandescent lamp, electricity is conducted through tungsten filaments to generate light by high heat for illumination. However, such an incandescent lamp consumes a lot of power, and hence being gradually substituted by fluorescent lamps.

A fluorescent lamp generally applies high voltage on electrodes to emit electrons hitting mercury vapor atoms for generating ionization and excitation phenomena. When the mercury vapor atoms return to an original state from an excitation state, an invisible electromagnetic wave of 253.7 nm in wavelength is emitted. Thereafter various fluorescent materials can be used to absorb and convert the electromagnetic wave into visible lights, such that the fluorescent lamp may emit various colors of light in accordance with the fluorescent materials.

Although the lighting efficiency of the fluorescent lamp is better than that of the incandescent lamp, yet in the society advocating energy saving and environmental protection, people still continue to develop new lighting devices which can meet requirements of energy saving and environmental protection for substituting the fluorescent lamp, because of the mercury vapor contained the fluorescent lamp. Therefore, a light-emitting diode (LED) lighting module is developed and greatly expected. When a LED is under a proper forward bias voltage, electrons and electron holes are respectively injected to N and P terminals. Then, the electrons and electron holes are combined at a P/N junction, thereby enabling the LED to emit light caused by the energy released in the form of light when the electrons drop to a basic state from an excited state to combine with the electron holes.

The lighting efficiency of the LED is better than that of the fluorescent lamp, and hence the LED has better energy saving performance than the fluorescent lamp. However, the light source device using the LED has poor light uniformity since the LED has a high directivity.

Therefore, there is a need to develop a novel light guide element and a light source device using the light guide element for providing uniform light.

SUMMARY OF THE INVENTION

One aspect of the present invention is to provide a light guide element and a light source device using the light guide element. The light guide element has a cone-shaped hollow portion, and the cone-shaped hollow portion can uniformize light emitted from a light-emitting diode so as to enable the light source device using the light guide element to provide more uniform light.

According to an embodiment of the present invention, the light guide element includes a main body. The main body has an upper optic surface, a lower optic surface opposite to the upper optic surface, and a cross-sectional cone-shaped hollow portion located at the lower optic surface and used to receive exterior light. At least one of the upper optic surface and the lower optic surface having a first microstructure pattern including a plurality of high-density areas and a plurality of low-density areas, wherein the high-density areas and the low-density areas are arranged alternately, and the high-density areas have microstructures designed with a density higher than a density of microstructures in the low-density areas.

According to another embodiment of the present invention, the light source device includes a light guide element and a light source. The light guide element includes a main body. The main body has an upper optic surface, a lower optic surface opposite to the upper optic surface, and a cross-sectional cone-shaped hollow portion located at the lower optic surface and used to receive exterior light. The light source is disposed to emit light into the main body of the light guide element through the cone-shaped hollow portion. At least one of the upper optic surface and the lower optic surface having a first microstructure pattern comprising a plurality of high-density areas and a plurality of low-density areas. The low-density area closest to the cross-sectional cone-shaped hollow portion is more adjacent to the light source according to the lower slope rate of the surface of the cross-sectional cone-shaped hollow portion.

According to still another embodiment of the present invention, the light guide element includes a main body. The main body has an upper optic surface, a lower optic surface opposite to the upper optic surface, and a cross-sectional cone-shaped hollow portion located at the lower optic surface and used to receive exterior light. At least one of the upper optic surface and the lower optic surface is delineated to multiple regions of different density of microstructure pattern arranged radially outwardly from the cross-sectional cone-shaped hollow portion.

It can be known form the above descriptions that the light guide element of the embodiment of the present invention uses the cone-shaped hollow portion to refract and diffuse light, thereby emitting the light of a light-emitting diode uniformly to exterior of the light guide element, and the light source device can provide more uniform light accordingly.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying drawings, wherein:

FIG. 2 is a vertical cross-sectional view of a light source device in accordance with an embodiment of the present invention;

FIG. 2a is a diagram showing a cubic structure of a cone-shaped hollow portion in accordance with an embodiment of the present invention;

FIG. 4a is a top view of a light source device in accordance with an embodiment of the present invention.

FIG. 4b is a vertical cross-sectional view of the light source device in FIG. 4a.

FIG. 6b is a vertical cross-sectional view of a light guide element of the light source device in FIG. 6a.

DETAILED DESCRIPTION

Figure 1:
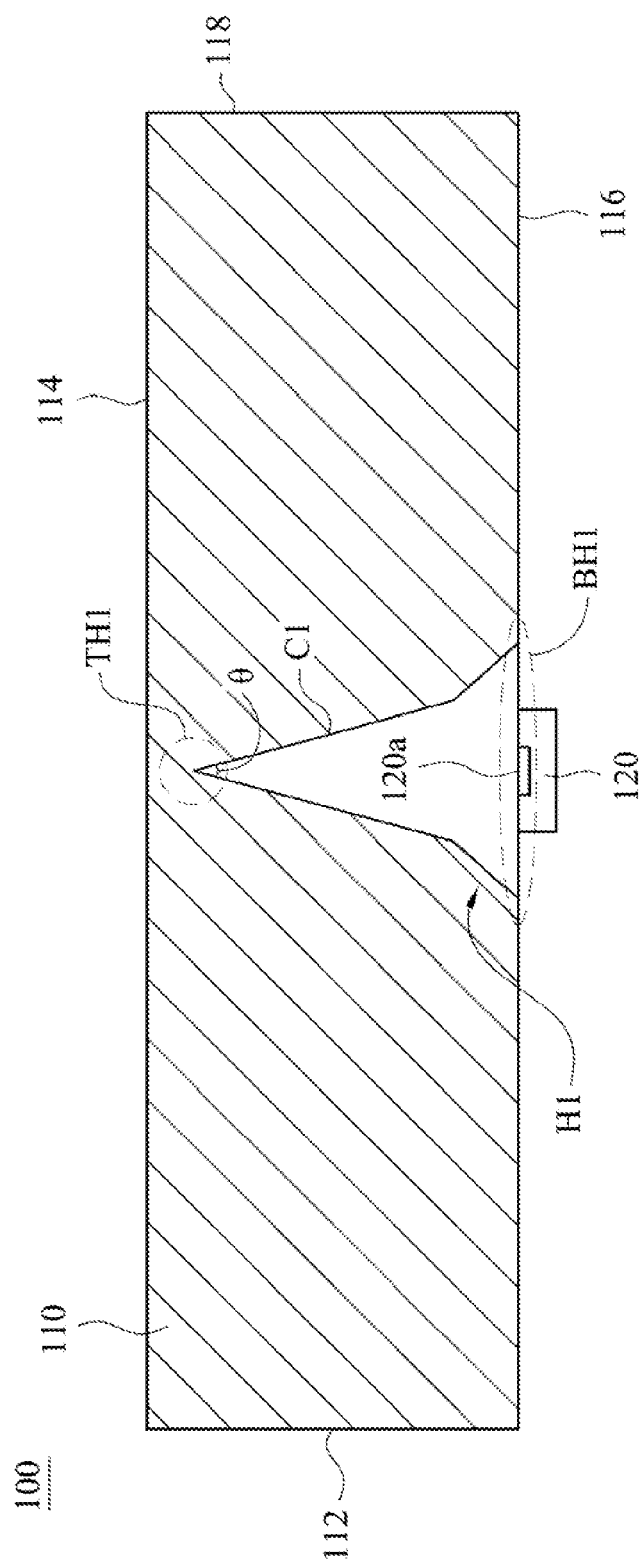
FIG. 1 is a vertical cross-sectional view of a light source device in accordance with an embodiment of the present invention.
Figure 1A:
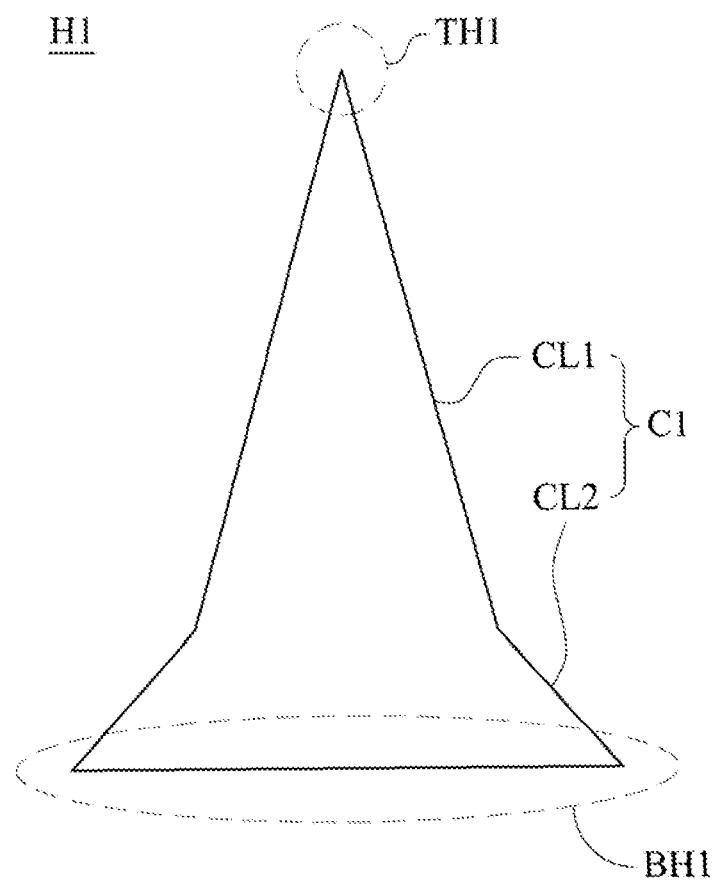
FIG. 1a is a cross-sectional view of a cone-shaped hollow portion in accordance with an embodiment of the present invention.

Referring to FIG. 1 and FIG. 1a simultaneously, FIG. 1 is a vertical cross-sectional view of a light source device 100 in accordance with an embodiment of the present invention, and FIG. 1a is a cross-sectional view of a cone-shaped hollow portion H1 in accordance with an embodiment of the present invention. The light source device 100 includes a light guide element 110 and a light-emitting diode 120. The light source device 100 of this embodiment uses the light-emitting diode 120 as a light source. However, embodiments of the present invention are not limited thereto. The light emitting diode 120 has a light-emitting surface 120a through which light is emitted to the light guide element 110.

A main body of the light guide element 110 has a light-emitting surface 114, a bottom surface 116, and side surfaces 112, 118, wherein the side surfaces 112 and 118 are located between the light-emitting surface 114 and the bottom surface 116, and the bottom surface 116 is opposite to the light-emitting surface 114. In this embodiment, the light-emitting surface 114 has microstructures for enabling the light in the light guide element 110 to be emitted out from the light guide element 110 through the light-emitting surface 114, but embodiments of the present invention are not limited thereto. In another embodiment, the bottom surface 116 may also have microstructures for enabling the light in the light guide element 110 to be emitted to outside from the light guide element 110 through the bottom surface 116. Thus, two lighting directions can be provided. In addition, the light guide element 110 of this embodiment has two side surfaces, but embodiments of the present invention are not limited thereto. In another embodiment, the light guide element may have only one side surface. For example, the light guide element is a disc light guide element.

The main body of the light guide element 110 has the cone-shaped hollow portion H1, and the cone-shaped hollow portion H1 has a bottom portion BH1 and a top portion TH1. The bottom portion BH1 is located at the bottom surface 116 of the light guide element 110, and the top portion TH1 is located adjacent to the light-emitting surface 114 and is opposite to the bottom portion BH1. The top portion TH1 of the cone-shaped hollow portion H1 has a diameter r1, and the bottom portion BH1 has a diameter r2, wherein r2>r1. In other words, a horizontal cross-sectional area of the hollow portion of the top portion TH1 is smaller than that of the hollow portion of the bottom portion BH1. In this embodiment, a contour of a cross section of a sidewall of the cone-shaped hollow portion H1 is a curve C1, and the curve C1 is formed from a plurality of straight lines CL1 and CL2, wherein the slope of each of the straight lines CL1 and CL2 can be gradually increased, gradually decreased, or randomly arranged. In addition, an apex angle (e.g., cone opening angle) of the cone-shaped hollow portion H1 is in a range from 20 degrees to 65 degrees.

Figure 1B:
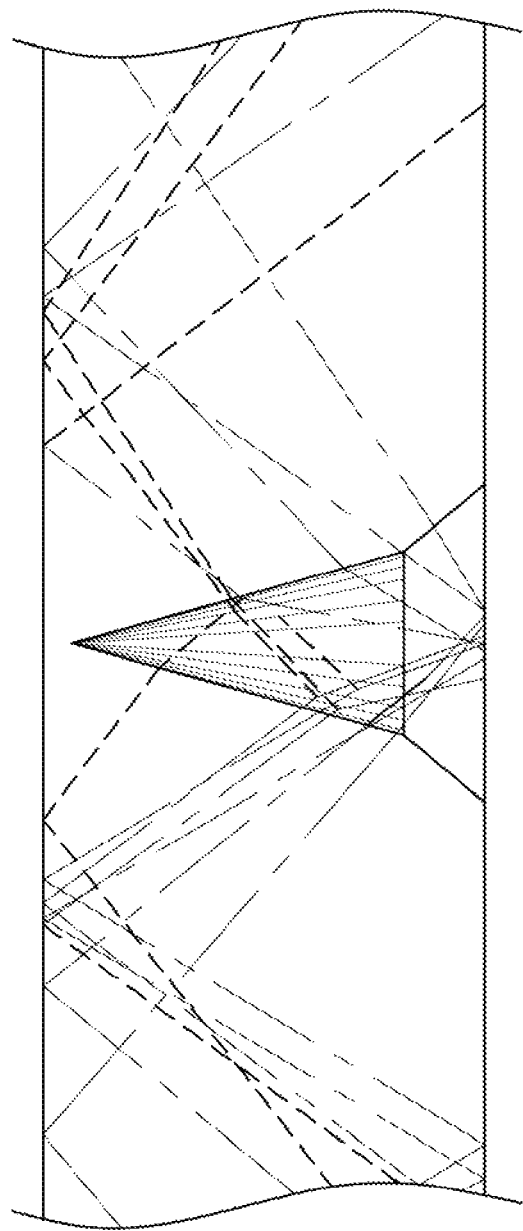
FIG. 1b is a diagram showing light paths of the light-emitting diode in the light guide element.

The light emitting diode 120 is disposed adjacent to the bottom portion BH1 of the cone-shaped hollow portion H1 to emit light into the light guide element 110. Referring to FIG. 1 b, FIG. 1b is a diagram showing light paths of the light-emitting diode 120 in the light guide element 110, wherein doted lines represent the light paths of the light-emitting diode 120 in the light guide element 110. It can be understood from the FIG. 1b that, after the light emitted from the light emitting diode 120 enters the cone-shaped hollow portion H1, the light of the light emitting diode 120 may enter the light guide element 110 at various angles through sidewalls of the cone-shaped hollow portion H1, and hence the light of the light emitting diode 120 can be uniformly emitted out through the light-emitting surface 114 of the light guide element 110.

It can be known from the above descriptions that the light guide element 110 uses the cone-shaped hollow portion H1 to uniformize the light of the light emitting diode 120, such that the light source device 100 can provide uniform light.

Referring to FIG. 2 and FIG. 2a simultaneously, FIG. 2 is a vertical cross-sectional view of a light source device 200 in accordance with an embodiment of the present invention, and FIG. 2a is a diagram showing a cubic structure of a cone-shaped hollow portion H2 in accordance with an embodiment of the present invention. The light source device 200 includes a light guide element 210 and the light-emitting diode 120. The guide element 210 is similar to the light guide element 110, but the difference is in that the light guide element 210 has a cone-shaped hollow portion H2.

The cone-shaped hollow portion H2 has a bottom portion BH2 and a top portion TH2. The bottom portion BH2 is located at the bottom surface 116 of the light guide element 210, and the top portion TH2 is located adjacent to the light-emitting surface 114 of the light guide element 210 and is opposite to the bottom portion BH2. The top portion TH2 of the cone-shaped hollow portion H2 has the diameter r1, and the bottom portion BH2 has the diameter r2, wherein r2>r1. In other words, a horizontal cross-sectional area of the hollow portion of the top portion TH2 is smaller than that of the hollow portion of the bottom portion BH2.

In this embodiment, the cone-shaped hollow portion H2 is in a shape of a polygon cone. However, embodiments of the present invention are not limited thereto. In another embodiment of the present invention, the cone-shaped hollow portion can be in a shape of a polygon cone, and a contour of a vertical cross section of sidewalls of the cone-shaped hollow portion is a curve or the line C1. In addition, the value of an apex angle of the cone-shaped hollow portion H2 is equal to the angle and the shapes of cross sections of the bottom portion BH2 and the top portion TH2 can be the same or different from each other.

The light emitting diode 120 is disposed adjacent to the bottom portion BH2 of the cone-shaped hollow portion H2 to emit light into the light guide element 210. After the light of the light emitting diode 120 enters the cone-shaped hollow portion H2 sidewalls of the cone-shaped hollow portion H2 guide the light of the light emitting diode 120 to the light guide element 210 at various angles, hence the light of the light emitting diode 120 can be emitted out uniformly through the light-emitting surface 114 of the light guide element 210.

It can be known from the above descriptions that the light guide element 210 of the embodiments of the present invention uses the cone-shaped hollow portion H2 to uniformize the light of the light emitting diode 120, and hence the light source device 200 can provide uniform light.

Figure 3:
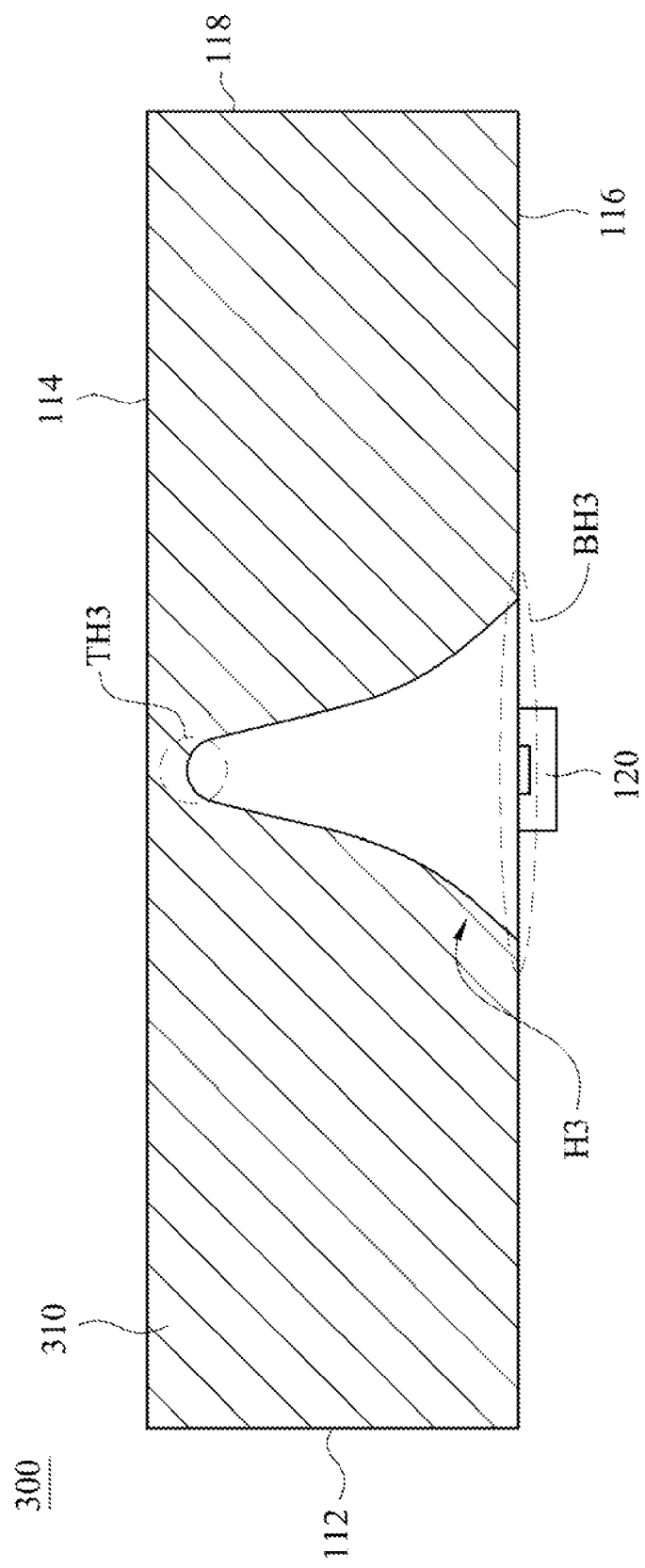
FIG. 3 is a vertical cross-sectional view of a light source device in accordance with an embodiment of the present invention.

Referring to FIG. 3. FIG. 3 is a vertical cross-sectional view of a light source device 300 in accordance with an embodiment of the present invention. The light source device 300 includes a light guide element 310 and the light-emitting diode 120. The light guide element 310 is similar to the light guide element 110, but the difference is in that the light guide element 310 has a cone-shaped hollow portion H3.

The cone-shaped hollow portion H3 has a bottom portion BH3 and a top portion TH3. The bottom portion BH3 is located at the bottom surface 116 of the light guide element 310, and the top portion TH3 is located adjacent to the light-emitting surface 114 of the light guide element 310 and is opposite to the bottom portion BH3. The top portion TH3 of the cone-shaped hollow portion H3 has the diameter r1 and the bottom portion BH3 has the diameter r2, wherein r2>r1. In other words, a horizontal cross-sectional area of the hollow portion of the top portion TH3 is smaller than that of the hollow portion of the bottom portion BH3.

Figure 3A:
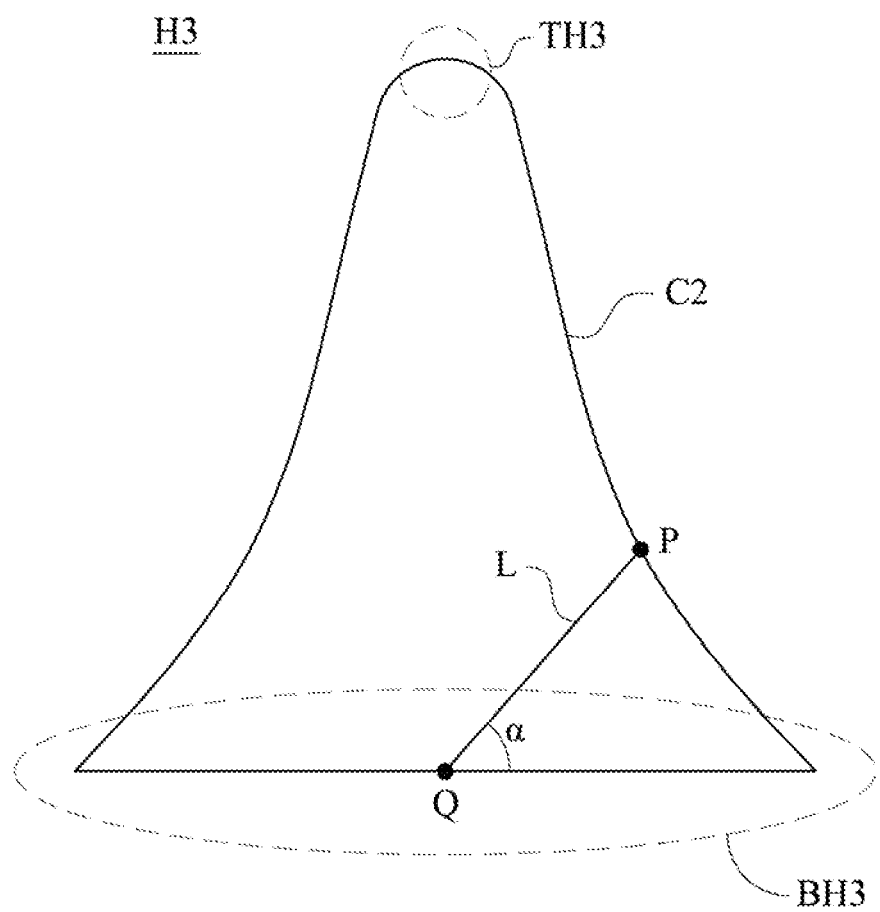
FIG. 3a is a cross-sectional view of the cone-shaped hollow portion in accordance with an embodiment of the present invention.

Referring to FIG. 3a simultaneously, FIG. 3a is a cross-sectional view of the cone-shaped hollow portion H3 in accordance with an embodiment of the present invention. In this embodiment, a contour of a cross section of a sidewall of the cone-shaped hollow portion H3 is a curve C2. A target point P on the curve C2 and a center point Q of the bottom portion BH3 form a straight line L, and there is an angle $\alpha$ included between the line L and the bottom portion BH3. When the value of the angle $\alpha$ is increased, a slope of a tangent line corresponding to the target point P is increased accordingly. In other words, the slope corresponding to the target point P is increased with the increasing height of the target point P, and a shape of the curve C2 is then formed as shown in FIG. 3a.

The light emitting diode 120 is disposed adjacent to the bottom portion BH3 of the cone-shaped hollow portion H3 to emit light into the light guide element 310. After the light of the light emitting diode 120 enters the cone-shaped hollow portion H3, sidewalls of the cone-shaped hollow portion H3 guide the light of the light emitting diode 120 to the light guide element 310 at various angles, hence the light of the light emitting diode 120 can be emitted out uniformly through the light-emitting surface 114 of the light guide element 310.

It can be known from the above descriptions that the light guide element 310 of the embodiments of the present invention uses the cone-shaped hollow portion H3 to uniformize the light of the light emitting diode 120, hence the light source device 300 can provide uniform light.

Figure 4B:
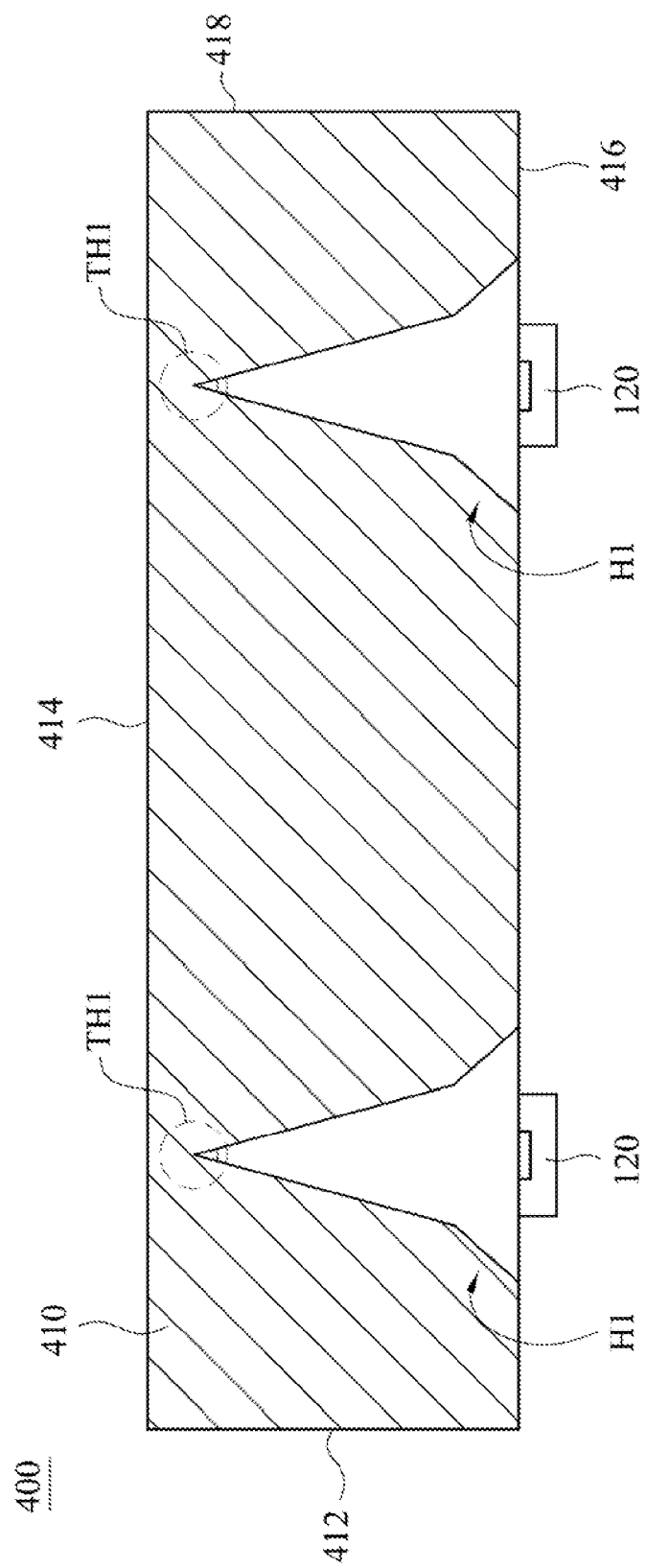

Referring to FIG. 4a and FIG. 4b, FIG. 4a is a top view of a light source device 400 in accordance with an embodiment of the present invention, and FIG. 4b is a vertical cross-sectional view of the light source device 400. The light source device 400 is similar to the light source device 100, but a difference is in that the light source device 400 includes a light guide element 410. The light guide element 410 is similar to the light guide element 110. A main body of the light guide element 410 has an upper optic surface 414, a lower optic surface 416, side surfaces 412, 418, and the cone-shaped hollow portion H1. The side surfaces 412 and 418 are located between the upper optic surface 414 and the lower optic surface 416, and the lower optic surface 416 is opposite to the upper optic surface 414.

A microstructure pattern MP is formed on the upper optic surface 414 for enabling the light in the light guide element 410 to be emitted to outside from the light guide element 410. As shown in FIG. 4a, the microstructure pattern MP includes microstructures includes high-density areas MPH and low-density areas MPL. The high-density areas MPH and the low-density areas MPL are ring-type areas and arranged alternately to form concentric circles. A center of the concentric circles is located on the top portion TH1 of the cone-shaped hollow portion H1. The high-density areas MPH have microstructures designed with higher density, and the low-density areas MPL have microstructures designed with lower density.

Figure 4C:
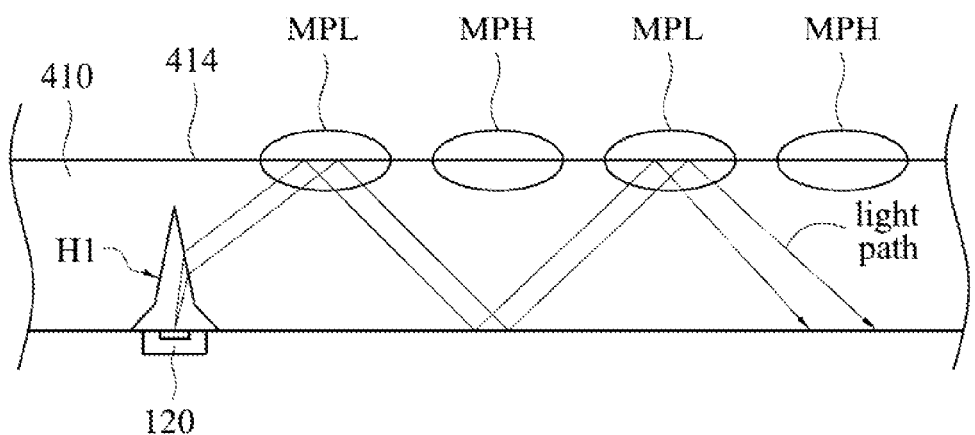
FIG. 4c is a diagram showing a relationship between light paths of a light-emitting diode and microstructure areas in accordance with an embodiment of the present invention.
Figure 4D:
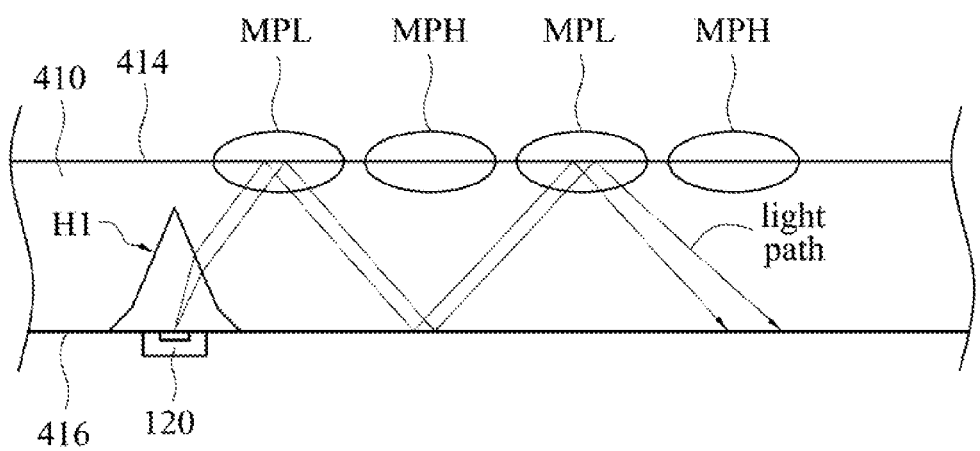
FIG. 4d is a diagram showing a relationship between light paths of a light-emitting diode and microstructure areas in accordance with an embodiment of the present invention.

Referring to FIG. 4c, FIG. 4c is a diagram showing a relationship between light paths of the light-emitting diode 120 and the areas MPH and MPL. The low-density areas MPL are formed corresponding to areas through which high-intensity light emits, and the high-density areas MPH are formed between every two adjacent low-density areas MPL, thereby achieving uniform lighting of the light source device 400. Further, the positions of the areas MPH and MPL are varied in accordance with a slope of a surface of the cone-shaped hollow portion H1. As shown in FIG. 4d, a slope of a surface of the cone-shaped hollow portion H1 in FIG. 4d is different from a slope of a surface of the cone-shaped hollow portion H1 in FIG. 4c, and thus the positions of the areas MPH and MPL in FIG. 4d are different from the positions of the areas MPH and MPL in FIG. 4c. Specifically, a low-density area MPL closest to the cross-sectional cone-shaped hollow portion H1 is more adjacent to the light source 120 according to the lower slope rate of the surface of the cross-sectional cone-shaped hollow portion H1.

Figure 4E:
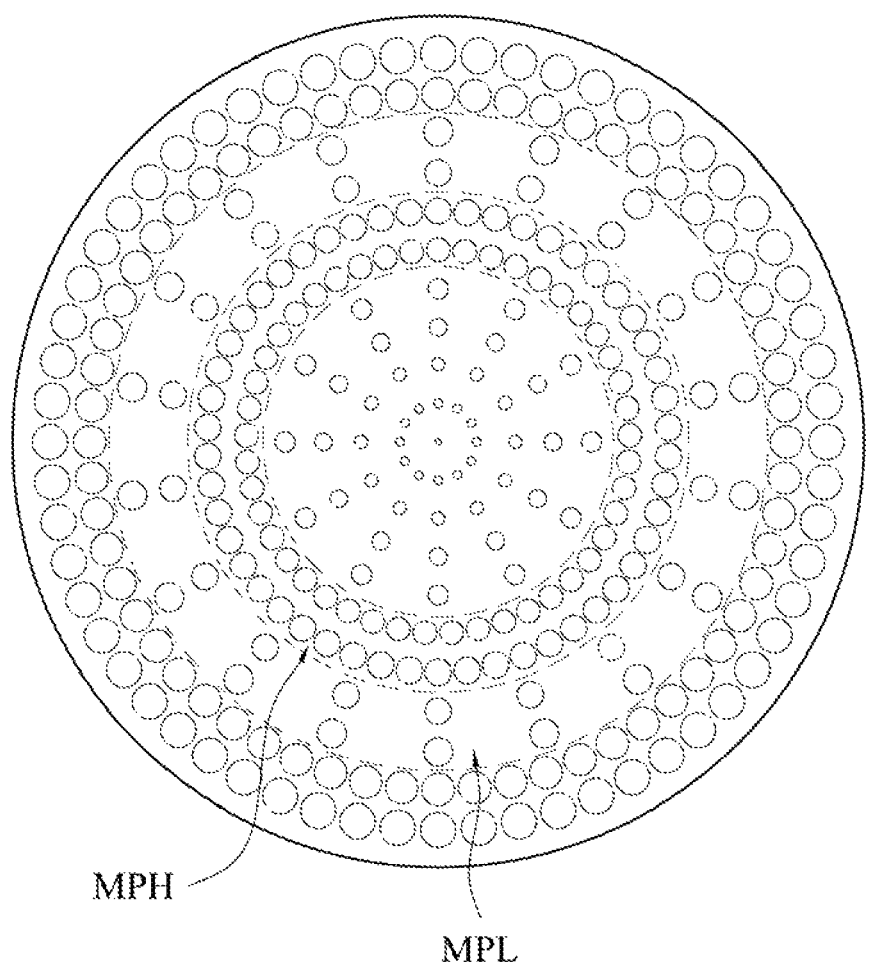
FIG. 4e is a top view of a light source device in accordance with an embodiment of the present invention.

Turning to FIG. 4a, in this embodiment, the microstructures in the areas MPH and MPL are designed to have the same size, but pitches between the microstructures in the high-density areas MPH are designed to be smaller than pitches between the microstructures in the low-density areas MPL, thereby forming the microstructure pattern MP. However, embodiments of the present invention are not limited thereto. In some embodiments, the microstructures in the areas MPH and MPL can be designed to have different sizes to form the microstructure pattern MP as shown in FIG. 4e.

Figure 4F:
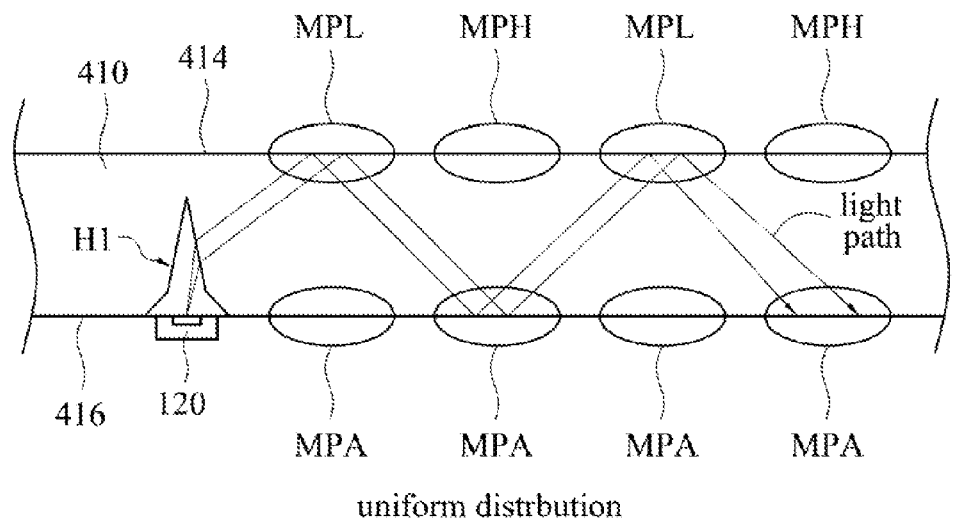
FIG. 4f is a diagram showing a relationship between light paths of a light-emitting diode and microstructure areas in accordance with an embodiment of the present invention.
Figure 4G:
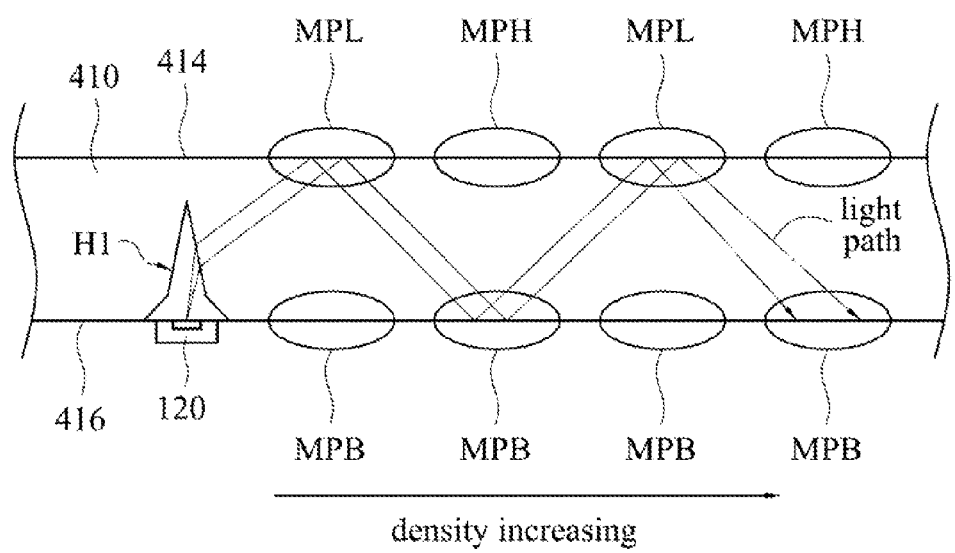
FIG. 4g is a diagram showing a relationship between light paths of a light-emitting diode and microstructure areas in accordance with an embodiment of the present invention.

It is noted that, the lower optic surface 416 may have another microstructure pattern in some embodiments of the present invention. For example, a microstructure pattern having a uniform density distribution is formed on the lower optic surface 416 as shown in FIG. 4f. In FIG. 4f, all microstructure areas MPA of the microstructure pattern have the same density. For another example, a microstructure pattern having an increasing density distribution is formed on the lower optic surface 416, as shown in FIG. 4g. In FIG. 4g, a density of each of the microstructure areas MPB of the microstructure pattern is increased with increasing of a distance between each of the microstructure areas MPB and the cone-shaped hollow portion H1.

In addition, since light leakage may occur at the top portion TH1 of the cone-shaped hollow portion H1, a density of microstructures formed on the top portion TH1 is determined in accordance with the light leakage of the top portion TH1.

Figure 5A:
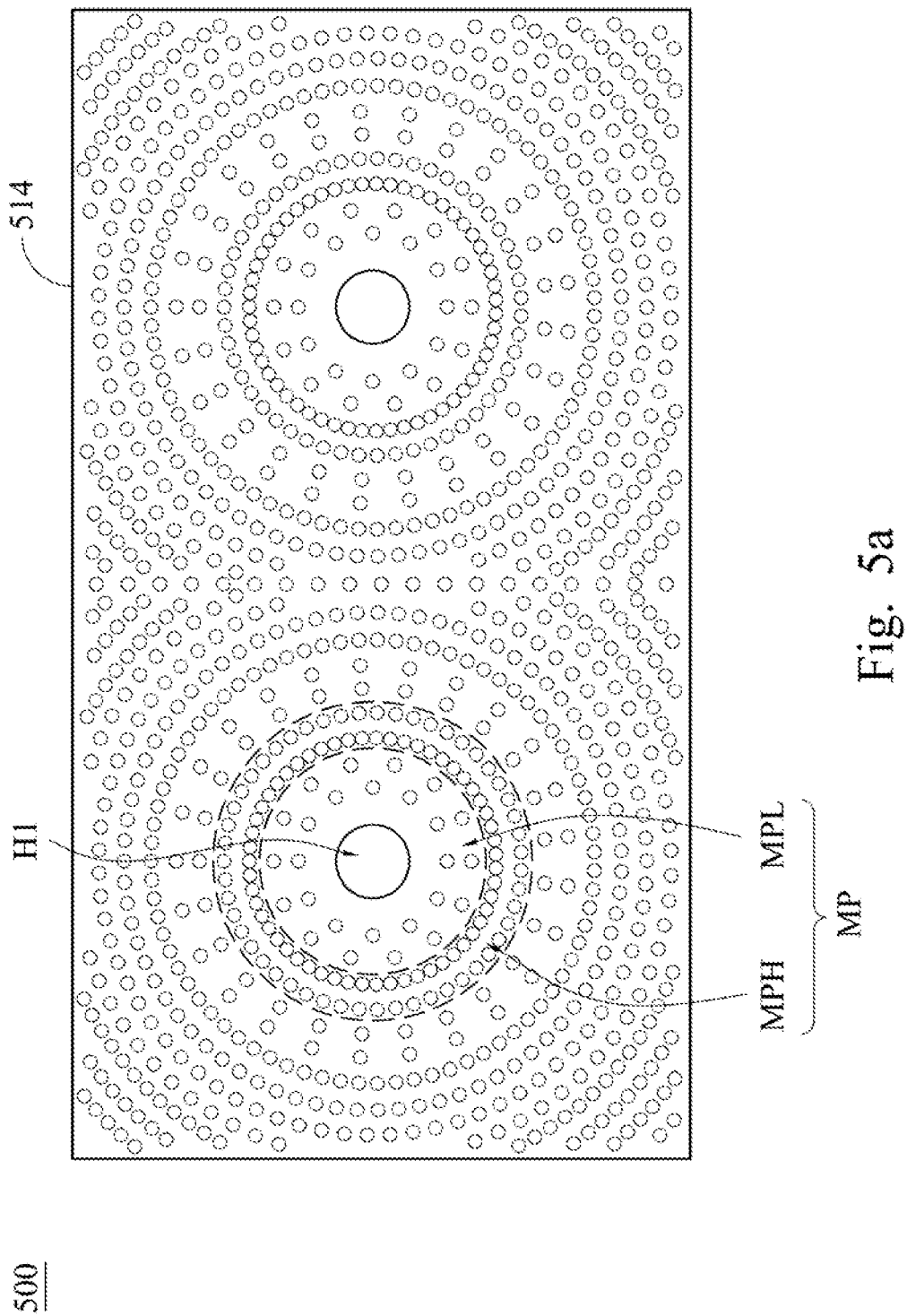
FIG. 5a is a bottom view of a light guide element of a light source device in accordance with an embodiment of the present invention.
Figure 5B:
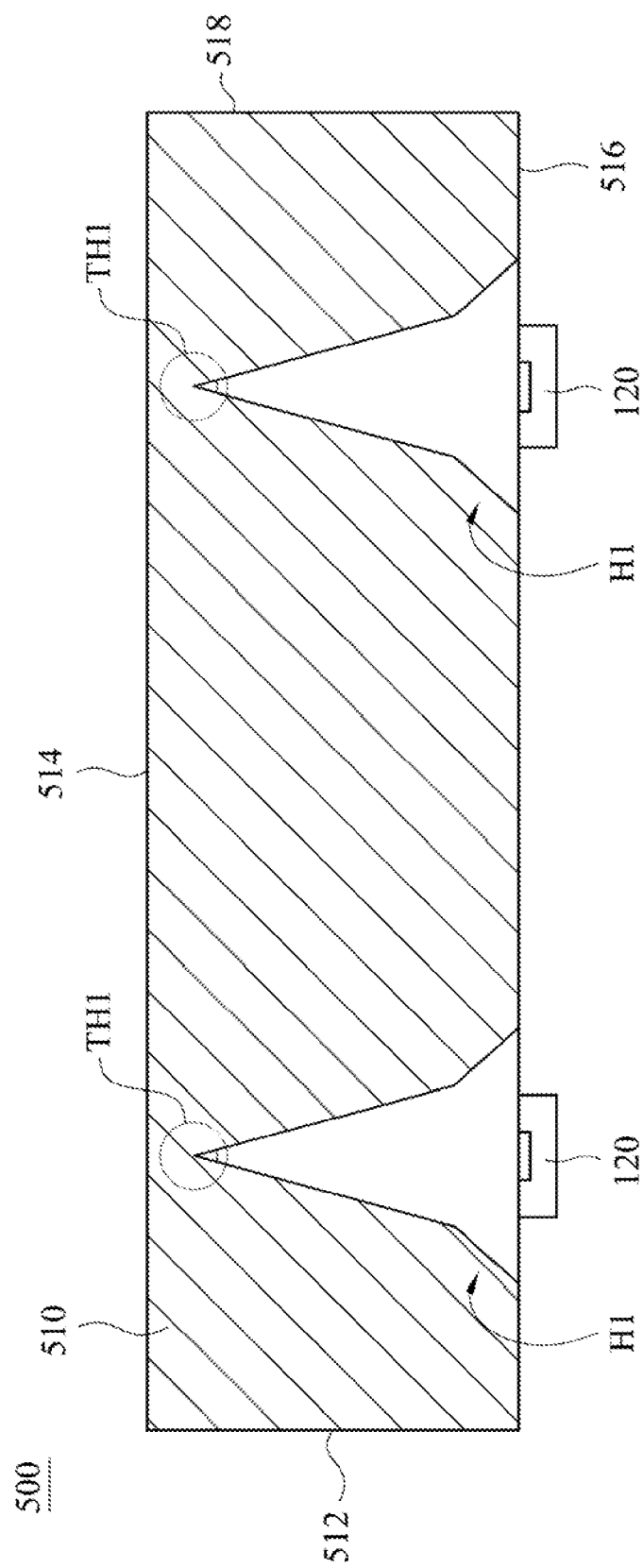
FIG. 5b is a vertical cross-sectional view of the light source device in accordance with an embodiment of the present invention.

Referring to FIG. 5a and FIG. 5b, FIG. 5a is a bottom view of a light guide element 510 of a light source device 500, and FIG. 5b is a vertical cross-sectional view of the light source device 500. The light source device 500 is similar to the light source device 400, but difference is in that the light source device 500 includes the light guide element 510 having the microstructure pattern MP. The light guide element 510 is similar to the light guide element 410. A main body of the light guide element 510 has an upper optic surface 514, a lower optic surface 516, side surfaces 512, 518, and the cone-shaped hollow portion H1. The side surfaces 512 and 518 are located between the upper optic surface 514 and the lower optic surface 516, and the lower optic surface 516 is opposite to the upper optic surface 514.

Figure 5C:
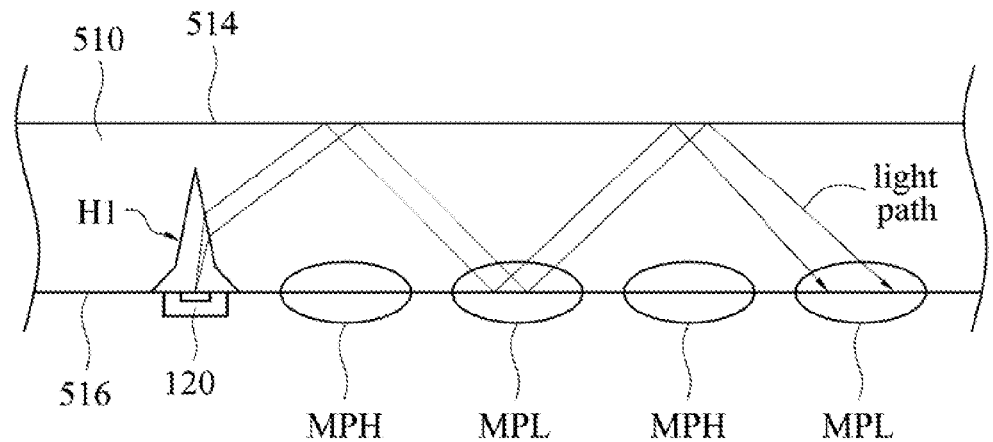
FIG. 5c is a diagram showing a relationship between light paths of a light-emitting diode and microstructure areas in accordance with an embodiment of the present invention.

Referring to FIG. 5c, FIG. 5c is a diagram showing a relationship between light paths of the light-emitting diode 120 and the areas MPH and MPL. As shown in FIG. 5c, the low-density areas MPL are formed corresponding to areas through which high-intensity light emits, and the high-density areas MPH are formed between every two adjacent low-density areas MPL, thereby achieving uniform lighting of the light source device 500. Since the microstructure pattern MP is formed on the lower optic surface 516, the light leakage of the top portion TH1 of the cone-shaped hollow portion H1 is not considered.

Figure 5D:
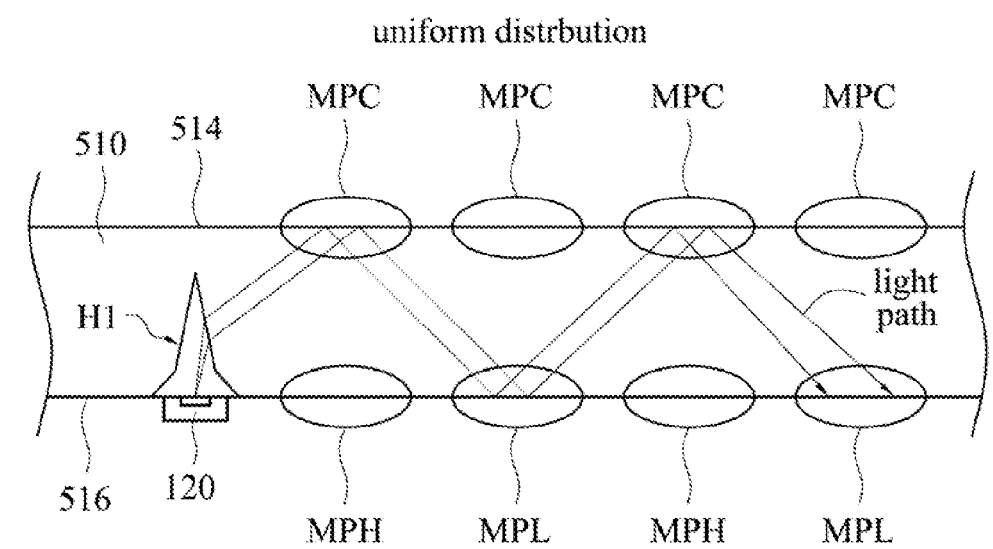
FIG. 5d is a diagram showing a relationship between light paths of a light-emitting diode and microstructure areas in accordance with an embodiment of the present invention.
Figure 5E:
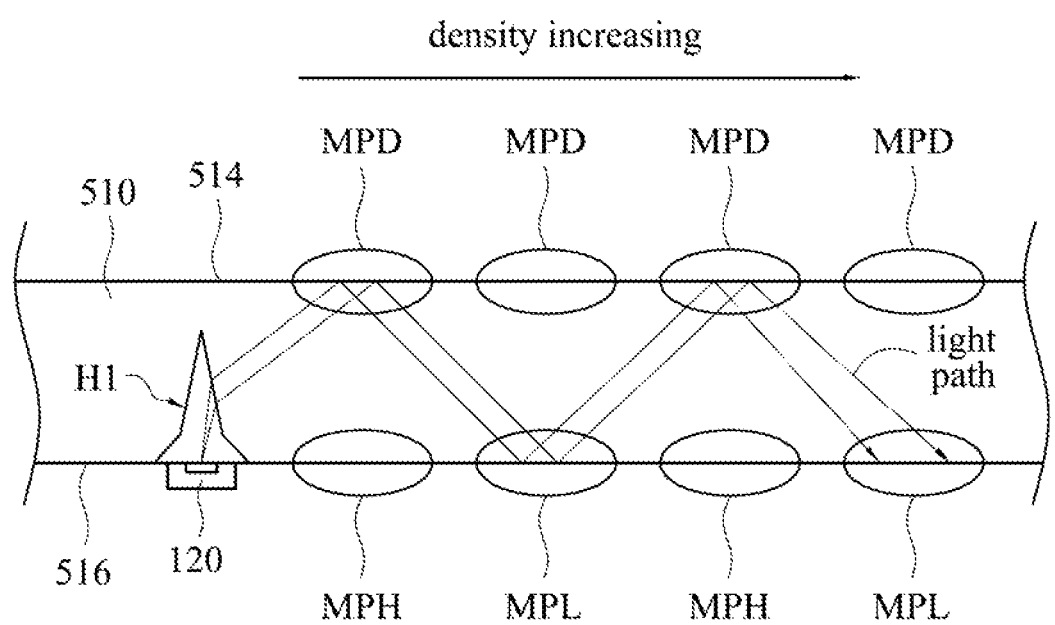
FIG. 5e is a diagram showing a relationship between light paths of a light-emitting diode and microstructure areas in accordance with an embodiment of the present invention.

It is noted that, the upper optic surface 514 may have another microstructure pattern in some embodiments of the present invention. For example, a microstructure pattern having a uniform density distribution is formed on the upper optic surface 514, as shown in FIG. 5d. In FIG. 5d, all microstructure areas MPC of the microstructure pattern have the same density. For another example, a microstructure pattern having an increasing density distribution is formed on the upper optic surface 514, as shown in FIG. 5e. In FIG. 5e, a density of each of the microstructure areas MPD of the microstructure pattern is increased with increasing of a distance between each of the microstructure areas MPD and the cone-shaped hollow portion H1.

Figure 6A:
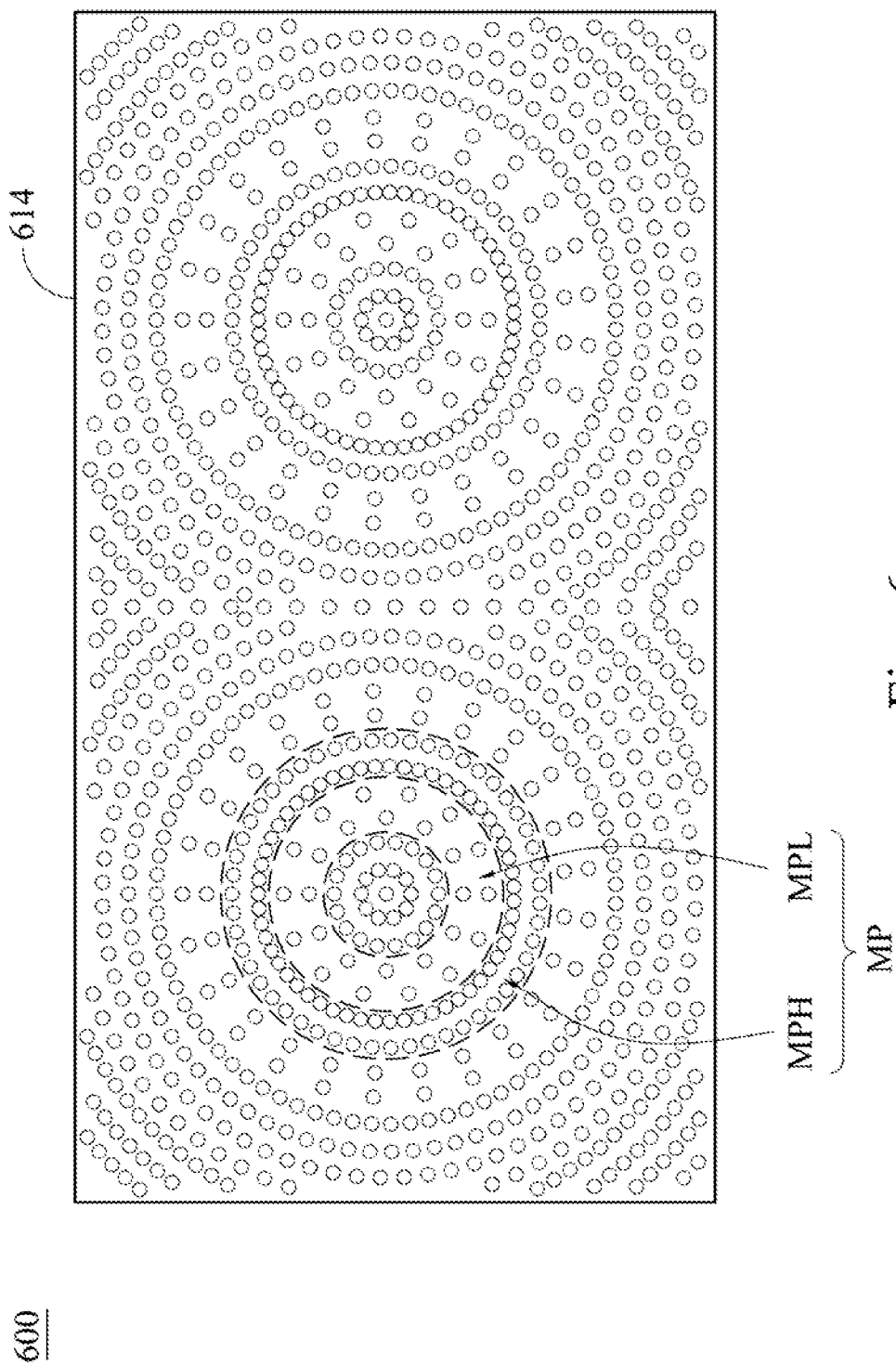
FIG. 6a a top view of a light source device in accordance with an embodiment of the present invention.
Figure 6B:
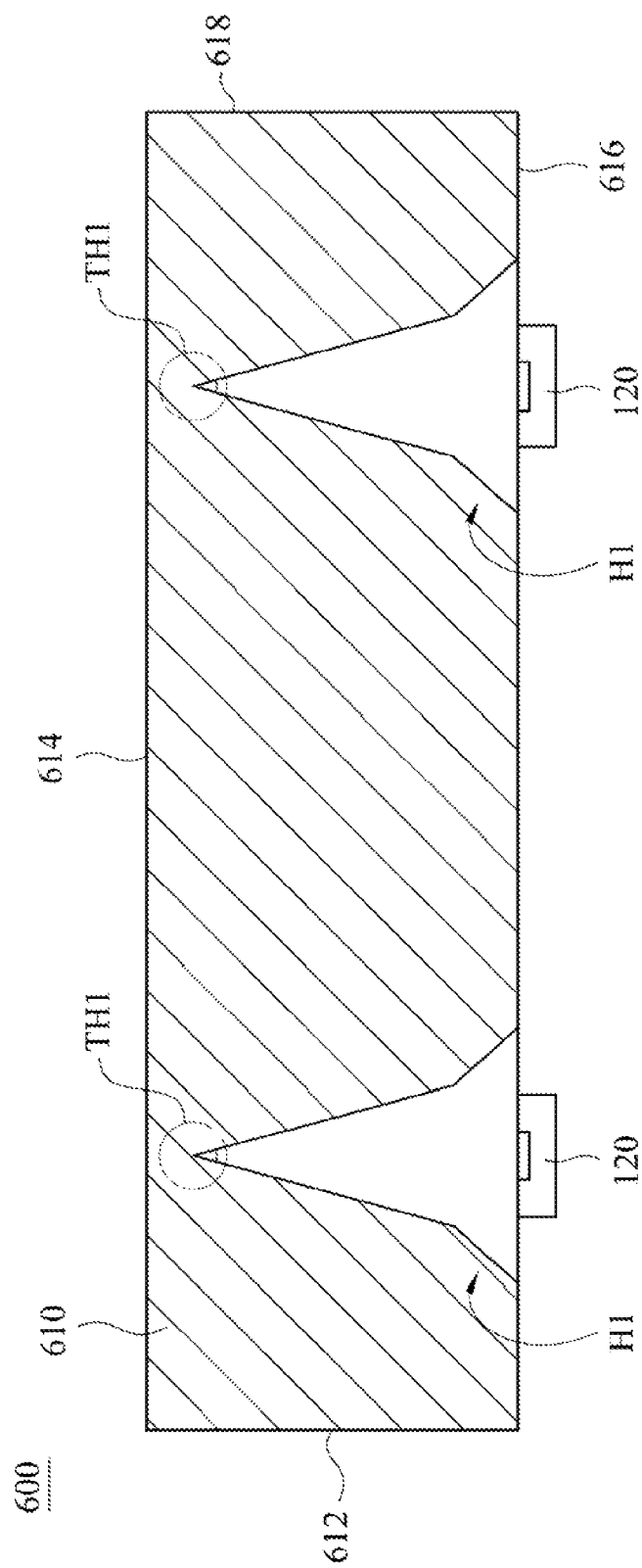

Referring to FIG. 6a, and FIG. 6b, FIG. 6a is a top view of a light source device 600 in accordance with an embodiment of the present invention, FIG. 6b is a vertical cross-sectional view of a light guide element 610 of the light source device 600. The light source device 600 is similar to the light source device 400, but the difference is in that the light source device 600 includes the light guide element 610 having two microstructure patterns MP formed on opposite surfaces. The light guide element 610 is similar to the light guide element 410. A main body of the light guide element 610 has an upper optic surface 614, a lower optic surface 616, side surfaces 612, 618, and the cone-shaped hollow portion H1. The side surfaces 612 and 618 are located between the upper optic surface 614 and the lower optic surface 616, and the lower optic surface 616 is opposite to the upper optic surface 614. In this embodiment, the two microstructure patterns MP are formed on the upper optic surface 614 and the lower optic surface 616 respectively to enable the light source device 600 to emit lights upward and downward simultaneously.

Figure 6C:
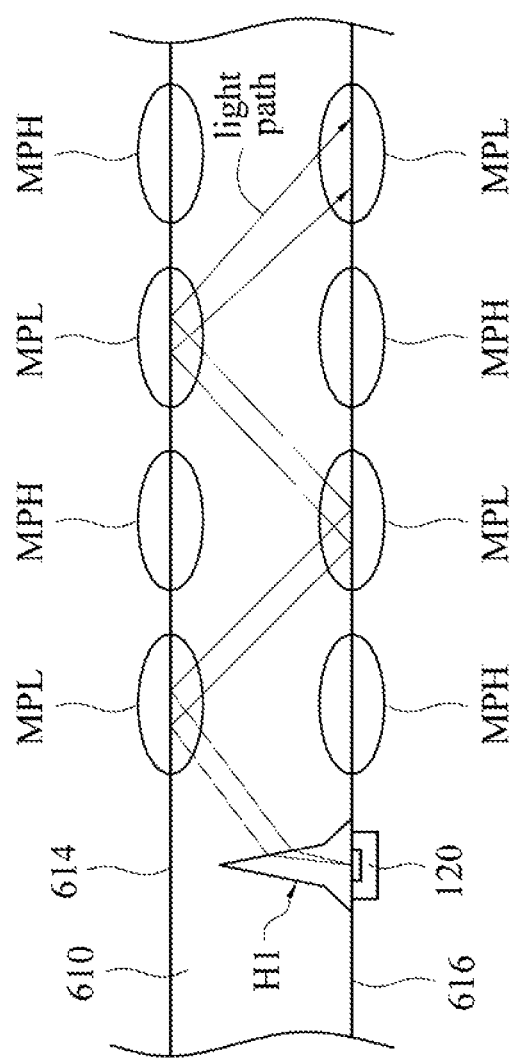
FIG. 6c is a diagram showing a relationship between light paths of the light-emitting diode and microstructure areas.

Referring to FIG. 6c, FIG. 6c is a diagram showing a relationship between ht paths of the light-emitting diode 120 and the areas MPH and MPL. As shown in FIG. 6e, the high-density areas MPH on the upper optic surface 614 are formed opposite to the low-density areas MPL on the lower optic surface 616, and the low-density areas MPL on the upper optic surface 614 are formed opposite to the high-density areas MPH on the lower optic surface 616. In other words, at least one of the of the upper optic surface 614 and the lower optic surface 616 is delineated to multiple regions of different density of the microstructure pattern arranged radially outwardly from the cross-sectional cone-shaped hollow portion H1. The arrangement of the high-density areas MPH and the low-density areas MPL achieves uniform lighting of the light source device 600 with respect to the upper optic surface 614 and the lower optic surface 616.

It can be understood that the microstructure pattern MP is used to improve a light distribution caused by the cone-shaped hollow portion H1. In addition, the microstructure pattern MP can be formed both two opposite sides of the light guide element of the light source device to enable the light source device 600 to emit lights upward and downward simultaneously.

As is understood by a person skilled in the art, the foregoing examples of the present disclosure are not a limitation. It is intended to cover various modifications and similar arrangements included within the spirit and scope of the appended claims, the scope of which should be accorded the broadest interpretation so as to encompass all such modifications and similar structures.

What is claimed is:
1. A light guide element, comprising:
 a main body having:
  an upper optic surface;
  a lower optic surface opposite to the upper optic surface; and a cross-sectional cone-shaped hollow portion located at the lower optic surface and used to receive exterior light;

wherein at least one of the upper optic surface and the lower optic surface has a first microstructure pattern comprising a plurality of high-density areas and a plurality of low-density areas, and the high-density areas and the low-density areas are arranged alternately, and the high-density areas have microstructures designed with a density higher than a density of microstructures in the low-density areas;

wherein the cross-sectional cone-shaped hollow portion comprises:

a bottom portion located at the lower optic surface, and having a first hollow cross-sectional area; and a top portion opposite to the bottom portion, and having a second hollow cross-sectional area, wherein the second hollow cross-sectional area is smaller than the first hollow cross-sectional area, and a center of concentric circles formed by the low-density areas and the high-density areas is located on the top portion.

2. The light guide element of claim 1, wherein the cone-shaped hollow portion is in a shape of a polygon cone.

3. The light guide element of claim 1, wherein the microstructures in the low-density areas and the high-density area have the same size, but pitches between the microstructures in the high-density areas are smaller than pitches between the microstructures in the low-density areas.

4. The light guide element of claim 1, wherein the microstructures in the low-density areas and the high-density areas have different sizes.

5. The light guide element of claim 1, wherein the other one of the upper optic surface and the lower optic surface without having the first microstructure pattern has a second microstructure pattern comprising a plurality of high-density areas and a plurality of low-density areas, and the high-density areas of the second microstructure pattern are opposite to the low-density areas of the first microstructure pattern, and the low-density areas of the second microstructure pattern are opposite to the high-density areas of the first microstructure pattern.

6. The light guide element of claim 1, wherein the other one of the upper optic surface and the lower optic surface without having the first microstructure pattern has a second microstructure pattern having a plurality of microstructure areas, and the microstructure areas have a uniform density distribution.

7. The light guide element of claim 1, wherein the other one of the upper optic surface and the lower optic surface without having the first microstructure pattern has a second microstructure pattern having a plurality of microstructure areas, and a density of each of the microstructure areas of the second microstructure pattern is increased with increasing of a distance between the cone-shaped hollow portion and each of the microstructure areas of the second microstructure pattern.

8. The light guide element of claim 1, wherein the first microstructure pattern is located on the lower optic surface.

9. The light guide element of claim 1, wherein the first microstructure pattern is located on the upper optic surface.

10. A light source device comprising:
a light guide element comprising:
a main body having:
an upper optic surface;
a lower optic surface opposite to the upper optic surface; and
a cross-sectional cone-shaped hollow portion located at the lower optic surface and used to receive exterior light; and
a light, source disposed to emit light into the main body of the light guide element through the cone-shaped hollow portion;
wherein at least one of the upper optic surface and the lower optic surface having a first microstructure pattern comprising a plurality of high-density areas and a plurality of low-density areas; and
wherein a distance between the low-density area closest to the cross-sectional cone-shaped hollow portion and the cross-sectional cone-shaped hollow portion is predetermined to be shorter along with the decreasing of an absolute value of a predetermined slope rate of a surface of the cross-sectional cone-shaped hollow portion.

11. The light source device of claim 10, wherein the microstructures in the low-density areas and the high-density areas have the same size, but pitches between the microstructures in the high-density areas are smaller than pitches between the microstructures in the low-density areas.

12. The light source device of claim 10, wherein the microstructures in the low-density areas and the high-density areas have different sizes.

13. The light source device of claim 10, wherein the other one of the upper optic surface and the lower optic surface without having the first microstructure pattern has a second microstructure pattern comprising a plurality of high-density areas and a plurality of low-density areas, and the high-density areas of the second microstructure pattern are opposite to the low-density areas of the first microstructure pattern, and the low-density areas of the second microstructure pattern are opposite to the high-density areas of the first microstructure pattern.

14. The light source device of claim 10, wherein the other one of the upper optic surface and the lower optic surface without having the first microstructure pattern has a second microstructure pattern having a plurality of microstructure areas, and the microstructure areas have a uniform density distribution.

15. The light source device of claim 10, wherein the other one of the upper optic surface and the lower optic surface without having the first microstructure pattern has a second microstructure pattern having a plurality of microstructure areas, and a density of each of the microstructure areas of the second microstructure pattern is increased with increasing of a distance between the cone-shaped hollow portion and each of the microstructure areas of the second microstructure pattern.

* * * * *